(12) United States Patent
Gretz

(10) Patent No.: US 9,048,644 B1
(45) Date of Patent: Jun. 2, 2015

(54) ELECTRICAL BOX ASSEMBLY WITH SIDING BLOCK AND WHILE-IN-USE COLLAPSIBLE COVER

(71) Applicant: Arlington Industries, Inc.

(72) Inventor: Thomas J. Gretz, Port St. Lucie, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 14/197,262

(22) Filed: Mar. 5, 2014

Related U.S. Application Data

(60) Provisional application No. 61/773,382, filed on Mar. 6, 2013.

(51) Int. Cl.
*H02G 3/08* (2006.01)
(52) U.S. Cl.
CPC ................................ *H02G 3/081* (2013.01)

(58) Field of Classification Search
USPC .............................. 174/50; 439/535; 248/906
See application file for complete search history.

(56) References Cited

U.S. PATENT DOCUMENTS

| | | | | |
|---|---|---|---|---|
| RE41,661 E | * | 9/2010 | Dinh ............................... | 174/50 |
| 8,445,780 B1 | * | 5/2013 | Robins ............................ | 174/67 |
| 8,704,091 B1 | * | 4/2014 | Shotey et al. ................... | 174/50 |

* cited by examiner

*Primary Examiner* — Dhirubhai R Patel

(57) ABSTRACT

An electrical box assembly including an electrical box with an integral siding block and a collapsible cover assembly. The collapsible cover assembly includes a frame member and a while-in-use cover plate. The cover assembly includes cord openings that enable closing of the cover plate while electrical cords are connected to electrical outlets within the electrical box. When desired, the cover assembly may be collapsed upon the electrical box to lower the profile of the electrical box assembly in order to limit the distance the assembly extends from the wall.

18 Claims, 8 Drawing Sheets

ELECTRICAL BOX ASSEMBLY WITH SIDING BLOCK AND WHILE-IN-USE COLLAPSIBLE COVER

This application claims the priority of U.S. Provisional Application Ser. No. 61/773,382 filed Mar. 6, 2013.

FIELD OF THE INVENTION

This invention relates to electrical boxes, and specifically to an electrical box with a siding block and a while-in-use collapsible cover.

BACKGROUND OF THE INVENTION

Electrical FS boxes for outdoor use are typically mounted on the exterior of buildings for providing convenient access to electrical outlets and other electrical devices such as switches and timers. Conventional FS boxes typically are a simple rectangular box configuration with a back wall and four side walls. When being mounted to a building, a rectangular hole must be cut in the substrate in order to mount the electrical box to the building. Cutting into the substrate creates a costly and time consuming repair job for the installer as he must typically caulk around the perimeter of the electrical box to seal against rain penetration between the box and the substrate. Although the caulk is meant to seal around the box, it is difficult to obtain a perfect seal making it likely that rain or water could seep behind the siding surrounding the box. Furthermore, cutting into the substrate can disrupt and damage the building's insulation layer that typically resides just under the substrate. There is also the problem of potentially damaging electrical wiring that is behind the area of the cut.

What is needed is an electrical box assembly that minimizes the need to cut a hole in the substrate and that accommodates siding in a manner that eliminates water seepage behind the siding. The electrical box assembly should provide protection against rain and weather to a receptacle mounted therein while an electrical cord is plugged into the receptacle. The electrical box should furthermore include a cover member that is collapsible, to reduce the profile of the electrical box when it is not in use.

SUMMARY OF THE INVENTION

The invention is an electrical box assembly including an electrical box with an integral siding block and a collapsible cover assembly. The collapsible cover assembly includes a frame member and a while-in-use cover plate. The cover assembly includes cord openings that enable closing of the cover plate while electrical cords are connected to electrical outlets within the electrical box. When desired, the cover assembly may be collapsed upon the electrical box to lower the profile of the electrical box assembly in order to limit the distance the assembly extends from the wall.

OBJECTS AND ADVANTAGES

A first object is to eliminate the need for an installer to cut a large hole in the outer substrate of the house. Cutting a large hole in the substrate can damage the insulation of a house. The present invention, by providing an integral siding block, eliminates the need for cutting a hole in the substrate. Only a small hole is required to be made in the substrate in order to pull wiring into the box.

A second object of the invention is to provide an electrical box assembly that combines the utility of an FS box with an integral siding block for providing a channel for accommodating siding around the periphery of the electrical box and channeling water away from the box and the surrounding siding.

A third object is to combine the functionality of a while-in-use cover with an FS style electrical box.

A further object of the invention is to provide additional versatility over existing field service boxes including the ability to collapse the electrical box assembly when desired in order to reduce its overall profile.

Another object is to provide an electrical box assembly that includes a collapsed configuration for completely sealing the interior of the field service box and its contents from rain, dirt, insects, and other hazards.

Another object is to provide an electrical box assembly that includes an expanded configuration for protecting the interior of the field service box while also providing cord openings for maintaining cord connection to an installed electrical receptacle with the cover closed.

A further object is to provide an electrical box assembly can be easily converted from an expanded to a compressed configuration and vice versa as desired by the homeowner.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
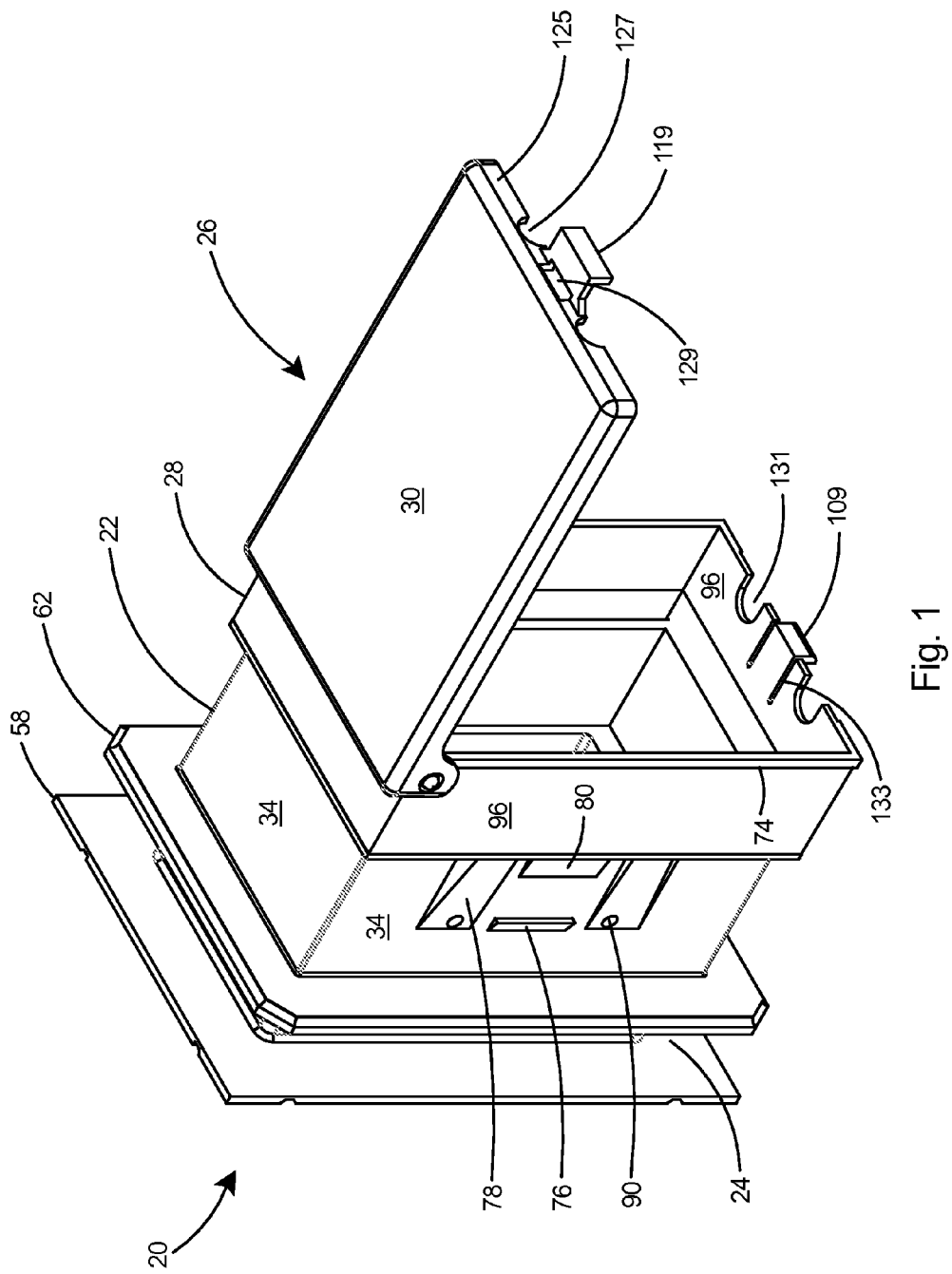
FIG. 1 is an isometric view of the preferred embodiment of a while-in-use electrical box with siding block and collapsible cover in accordance with embodiments of the invention.

With reference to FIG. 1, the present invention comprises an electrical box assembly 20 for mounting electrical components to the exterior of a house or other building with siding installed on the exterior or to an unfinished exterior that will be finished with siding. The electrical box assembly 20 includes an electrical box 22 with an integral siding block 24 and a collapsible cover assembly 26. The collapsible cover assembly 26 includes a frame member 28 and a cover plate or cover member 30.

Figure 2:
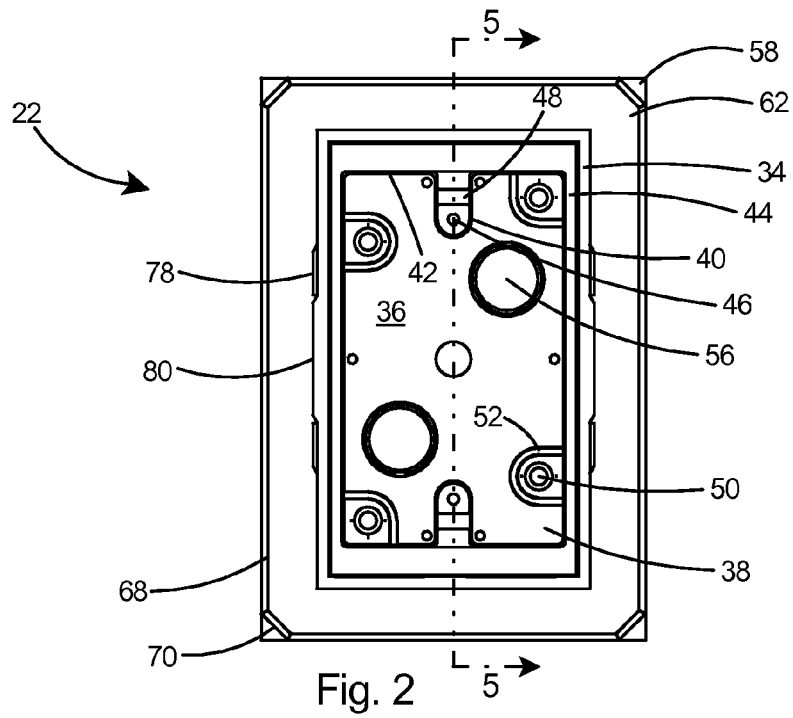
FIG. 2 is a front view of an electrical box which forms a portion of the while-in-use electrical box of FIG. 1.
Figure 3:
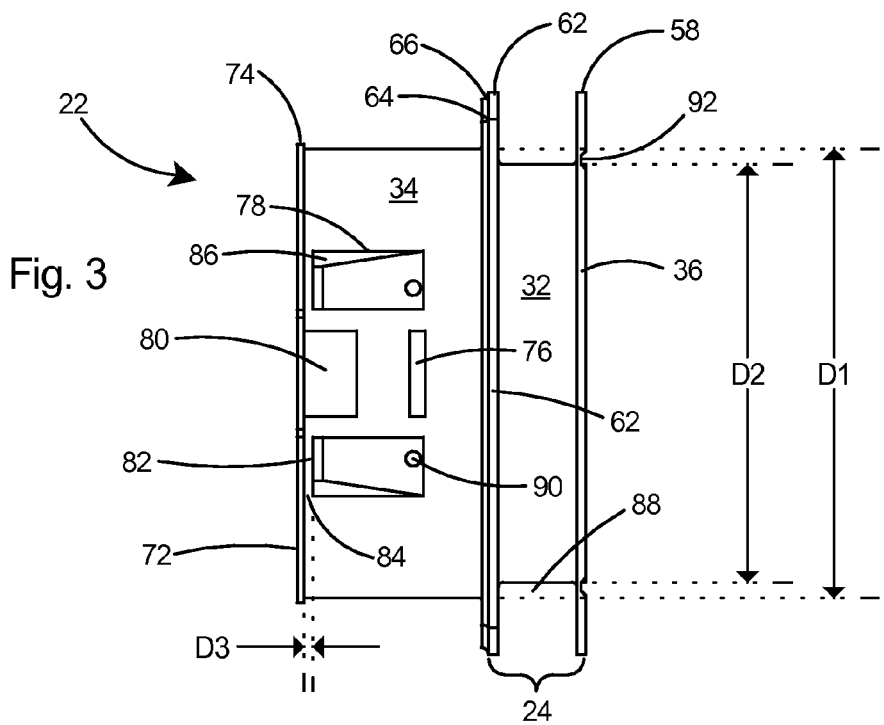
FIG. 3 is a side view of the electrical box of FIG. 2.

Referring to FIGS. 2-3, the electrical box 22 includes four inner sidewalls 32, four outer sidewalls 34, and a back wall 36 that define the inner enclosure or cavity 38. Outer sidewalls 34 are of a larger dimension D1 than the inner sidewalls 32 of dimension D2. Two bosses 40 extend from the inner surface 42 of the outer sidewalls 34. A peripheral wall 44 extends between the inner sidewalls 32 and outer sidewalls 34. Bosses 40 include component mounting bores 46 therein and a groove 48 adjacent the mounting bores 46 and extending fully across each boss 40.

The electrical box 22 includes a plurality of apertures 50 in the back wall 36 with each of the apertures 50 including a surrounding peripheral wall 52 extending into the enclosure 38 from the back wall 36. The back wall 36 further includes a plurality of knockouts 56 therein. A base flange 58 extends from the entire periphery of the inner sidewalls 32. The base flange 58 is coplanar with the back wall 36 and includes breakaway grooves 92 therein. A second flange 62 extends from the outer periphery of the outer sidewalls 34 and includes a wide base portion 64 and a smaller outer portion 66 that includes a beveled edge 68 and four truncated corners 70. The outer sidewalls 34 include a front edge 72 and a peripheral wall 74 extending laterally outward around the entire outer periphery of the front edge 72.

As shown in FIG. 3, electrical box 22 includes an inner stop 76, two outer stops 78, and a pressure tab 80 extending outward from the outer sidewalls 34. Outer stops 78 include an engagement edge 82. A gap 84 is formed between the peripheral wall 74 and engagement edge 82 of outer stop 78. Gap 84, as denoted in FIG. 3, is preferably of dimension D3. Outer stops 78 include a sloped side 86. Base flange 58 and second flange 62 form a channel 88, which together with inner sidewalls 32 define a siding block 24 for accommodating siding when the electrical box 22 is secured to a wall. A friction lug 90 extends outward from each outer stop 78.

Figure 4:
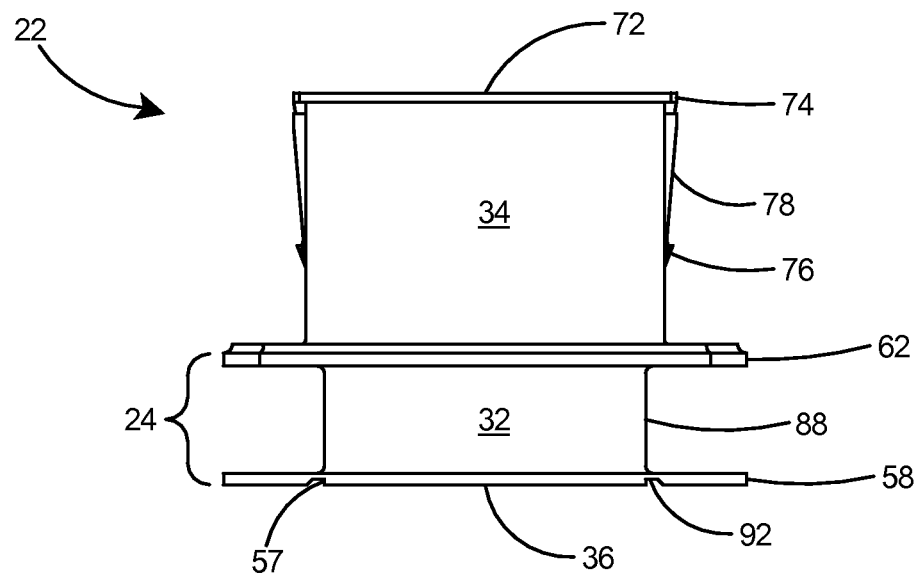
FIG. 4 is an end view of the electrical box.
Figure 5:
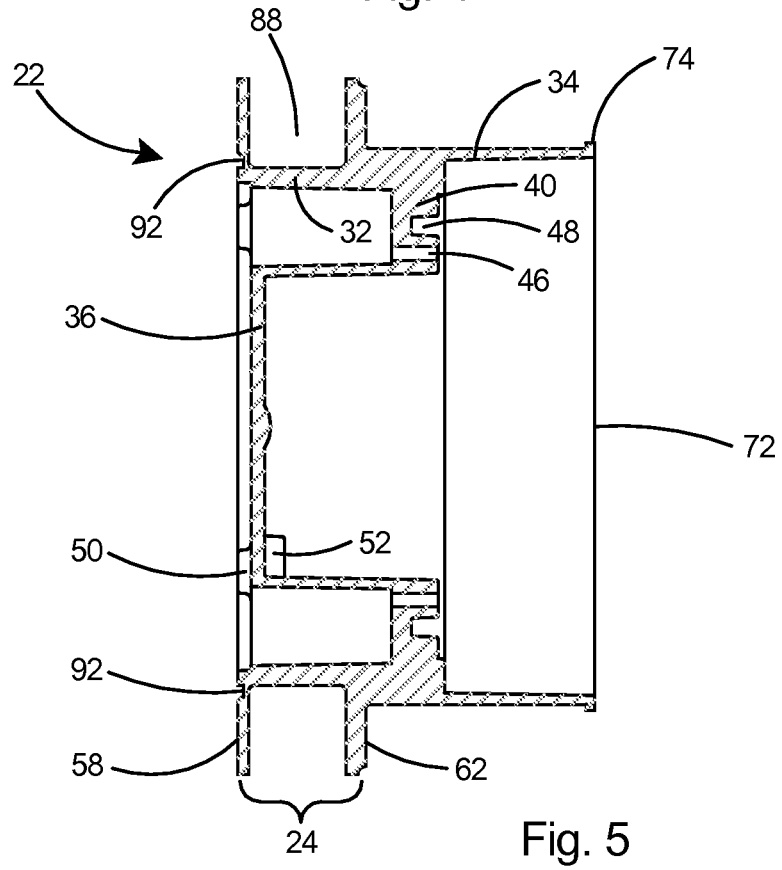
FIG. 5 is a sectional view of the electrical box taken along line 5-5 of FIG. 2.
Figure 6:
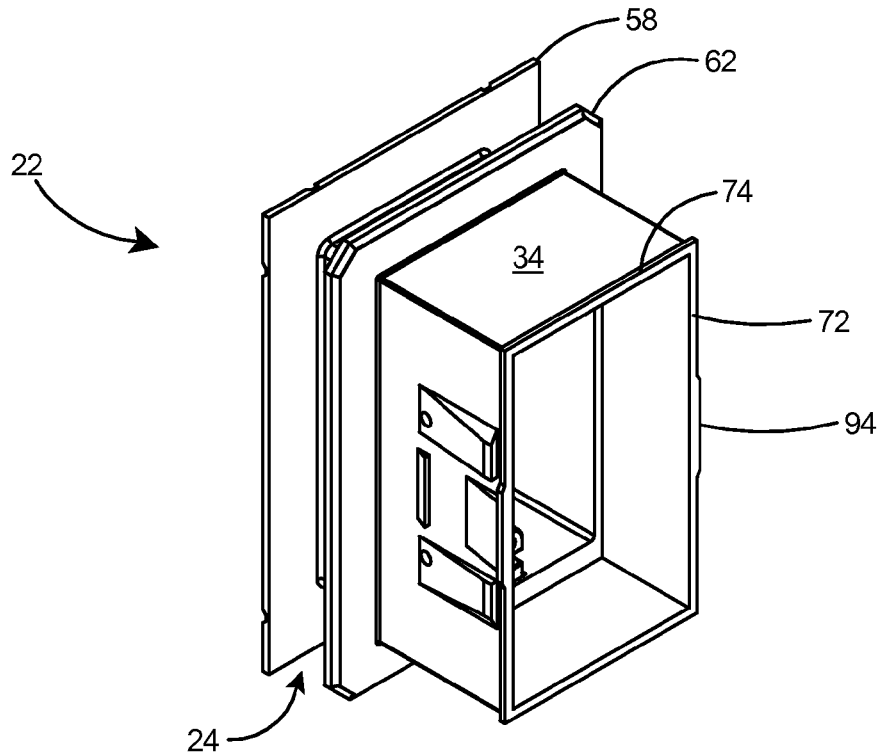
FIG. 6 is a front perspective view of the electrical box.
Figure 7:
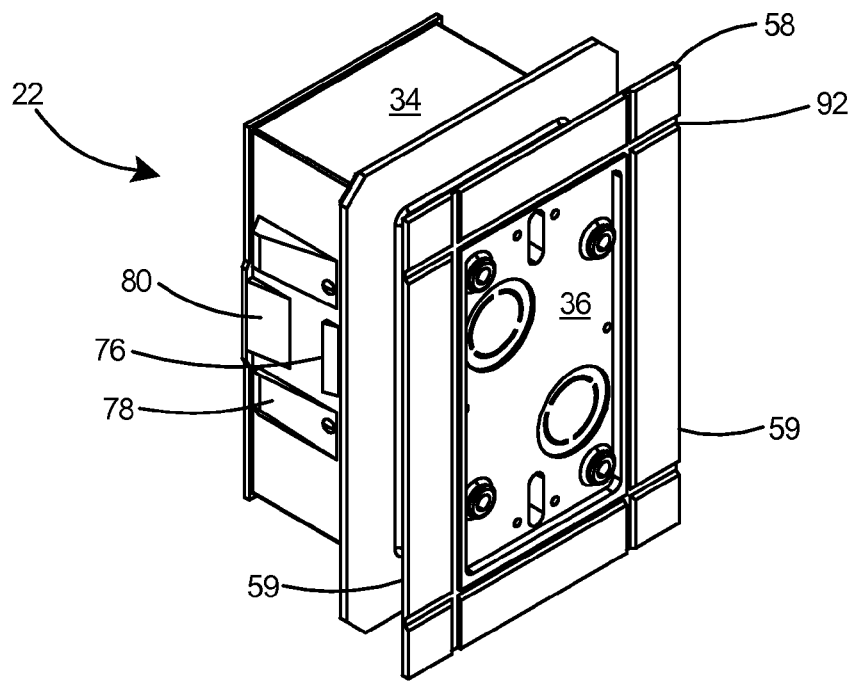
FIG. 7 is a rear perspective view of the electrical box.

Referring to FIGS. 4 and 5, base flange 58 includes one or more breakaway grooves 92 therein. Breakaway grooves 92 enable an installer to modify the electrical box 22 to facilitate installation of the electrical box assembly on an existing structure or old work situation. By scoring with a utility knife or similar sharp blade and bending along the score line, an installer can remove the base flange 58 from the electrical box 22. Inner edge 57 of breakaway grooves 92 are preferably in alignment with inner sidewalls 32 of electrical box 22, thereby enabling base flange 58 to break off flush with inner sidewalls 32. With the base flange 58 removed, a rectangular hole, large enough to receive the inner sidewalls 32, may be cut in the siding (not shown) to accommodate the electrical box. For new construction, the base flange 58 is retained with the box 22. For old work or new construction, the electrical box is secured to the substrate by driving fasteners through apertures 50 in back wall 36. Base flange 58 underlies the siding and shields the substrate from rain or water penetration. The integral siding block 24 ensures that any rain or water falling in channel 88 will fall to the bottom of the electrical box channel 88 and fall away from the siding and will not penetrate behind the electrical box assembly and the siding surrounding the assembly. As shown in FIG. 6, the electrical box 22 further includes a lip 94 extending outward laterally from opposing sides of the peripheral wall 74. The lip 94 is centered on each side of the peripheral wall. As shown in FIG. 7, breakaway grooves 92 extend completely across base flange 58, from side 59 to side 59.

Figure 8:
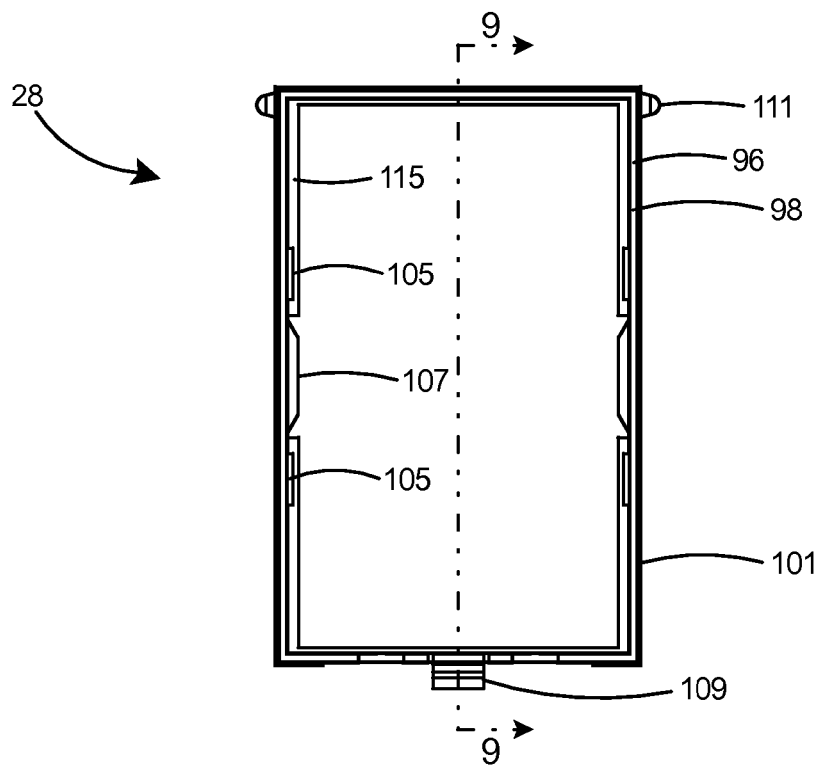
FIG. 8 is a front elevation view of a frame member which forms a portion of the while-in-use electrical box of FIG. 1.
Figure 9:
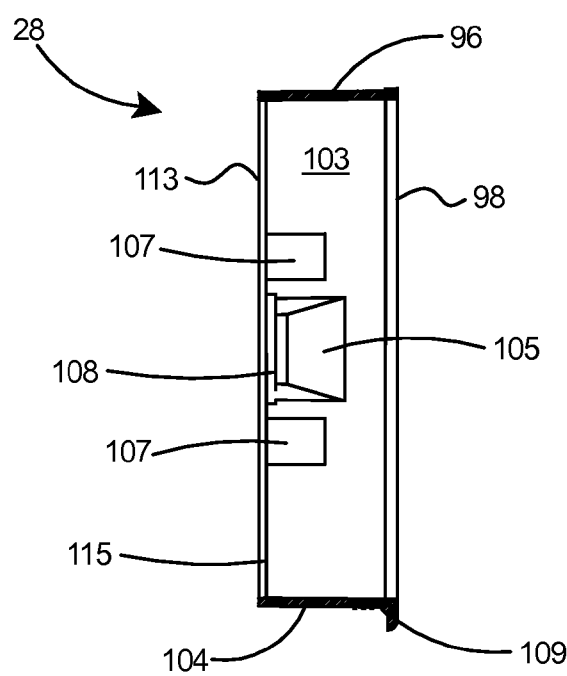
FIG. 9 is a sectional view of the frame member taken along line 9-9 of FIG. 8.

With reference to FIGS. 8 and 9, the frame member 28 includes four frame sidewalls 96 having a top edge 98 and an outer peripheral wall 101 extending outward at the top edge. Extending from the inner surface 103 of two opposing frame sidewalls 96 are a center stop 105 and two ramps 107. Center stop 105 includes a flat engagement edge 108. A tab 109 extends downward from the outer surface 104 of one short frame sidewall 96 and two posts 111 extend outward from two opposing long sidewalls. As shown in FIG. 9, frame member 28 further includes a bottom edge 113 and an inner peripheral wall 115 extending inward at the bottom edge.

Figure 10:
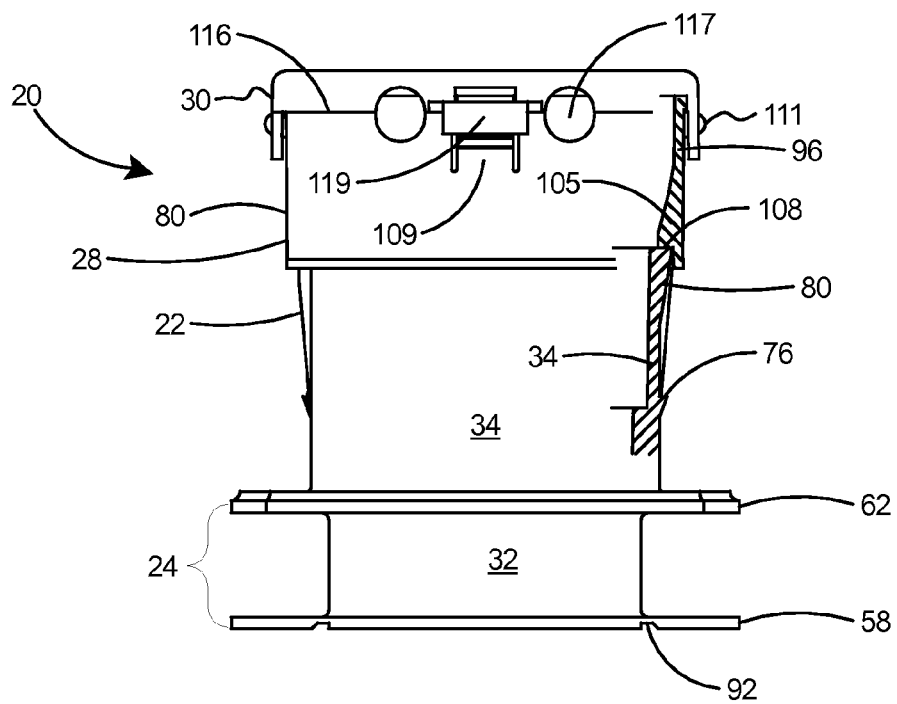
FIG. 10 is an end view of the while-in-use electrical box in an expanded configuration with a portion of the sidewall cut away.
Figure 11:
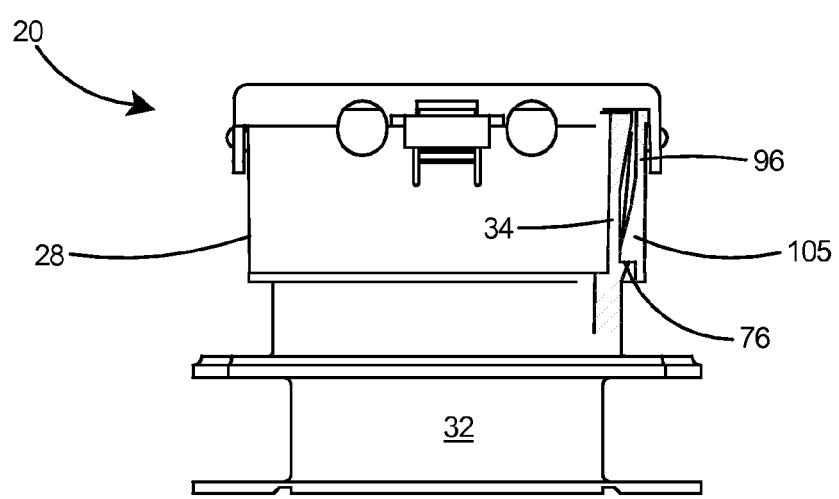
FIG. 11 is an end view of the while-in-use electrical box in a collapsed configuration with a portion of the sidewall cut away.
Figure 12:
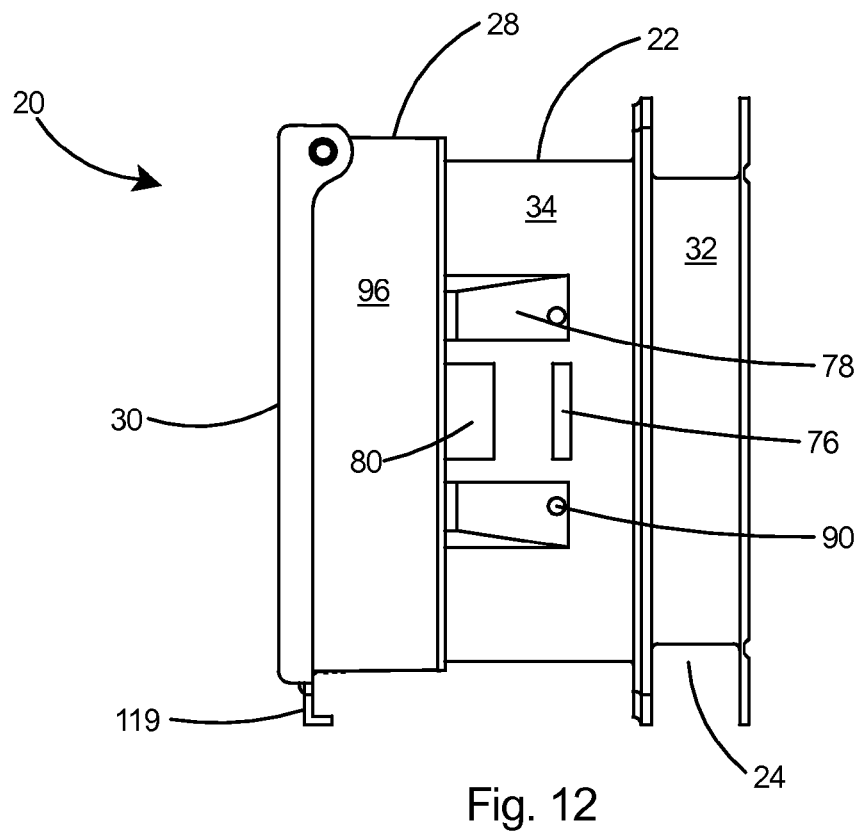
FIG. 12 is a side view of the while-in-use electrical box in an expanded configuration.
Figure 13:
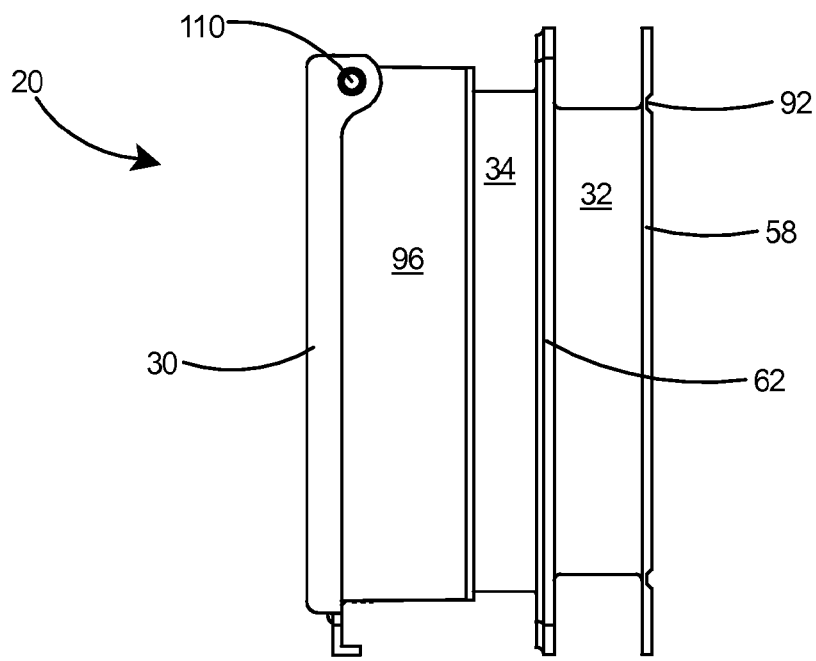
FIG. 13 is a side view of the while-in-use electrical box in a collapsed configuration.

Referring to FIGS. 10 and 11, FIG. 10 depicts the electrical box assembly 20 in an expanded configuration and FIG. 11 depicts the electrical box assembly 20 in a collapsed configuration. The frame member 28 of the collapsible cover assembly, including the cover plate 30 and frame member 28, is slideable with respect to the outer sidewalls 34 of the electrical box 22. In the expanded configuration of FIG. 10, center stop 105 of frame member 28 is engaged by pressure tab 80 of electrical box 22 and inner peripheral wall 115 (see FIG. 9) of frame member 28 is engaged by outer stops 78 of electrical box, which holds the electrical box assembly 20 in the expanded configuration. To collapse the electrical box assembly, finger pressure is applied to opposing pressure tabs 80 thereby temporarily decreasing the effective width of the electrical box 22. Once flat engagement edge 108 of frame member 28 clears pressure tab 80 of electrical box 22, as shown in FIG. 11 the frame sidewalls 96 of frame member 28 slip over the outer sidewalls 34 of electrical box 22 and continue to collapse until center stop 105 of frame member 28 is engaged by inner stop 76 of electrical box 22.

With electrical box assembly 20 in an expanded configuration as shown in FIG. 10, two electrical cord openings 117 are formed on the bottom side of the assembly at the juncture 116 of the cover 30 and the frame member 28. Cover member 30 includes a latch 119 that engages tab 109 of frame member 28 to latch the cover member onto the frame member 28.

Figure 14:
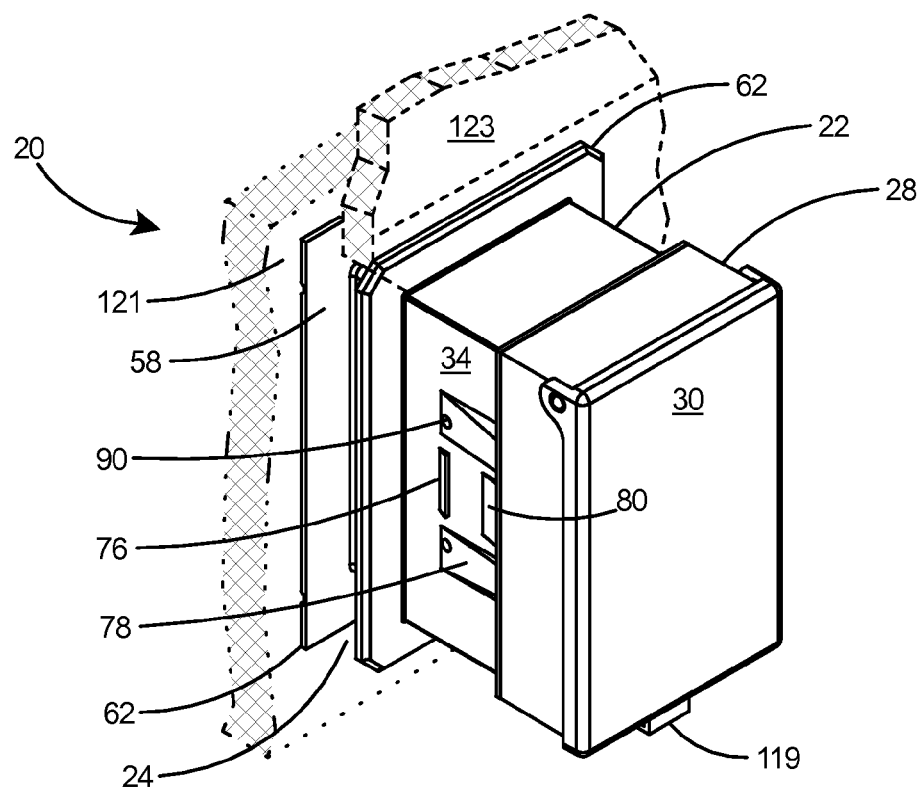
FIG. 14 is a front isometric view of the while-in-use electrical box in an expanded configuration.

Referring to FIG. 14, the electrical box assembly 20 is depicted in the expanded configuration. In the expanded configuration, frame member 28 is locked at the outward edge of the electrical box 22 by engagement outer stops 78 and pressure tab 80 engaging respectively the inner peripheral wall 115 and center stop 105 (see FIG. 9) of the frame member 28. After the electrical box assembly is secured to the substrate 121, siding 123 is inserted into the siding block 24 between base flange 58 and second flange 62. After siding 123 is secured around the electrical box 22 within the siding block 24, the substrate 121 is protected against rain or water penetration. Any water falling on the siding will enter the siding block 24 but, as a result of the wide base flange 58, cannot penetrate to the substrate.

In an old work situation, the base flange 58 is removed and a rectangular hole, large enough to accommodate the inner sidewalls 32, is cut in the siding 123. The electrical box assembly 20 is placed into the hole with the back wall 36 flush against the substrate 121. Fasteners (not shown) are then driven through apertures 50 (see FIG. 2) in back wall 36 of electrical box 22 as described hereinabove to secure the electrical box assembly to the substrate. Caulk may then be applied around the periphery of the electrical box assembly 20 where it meets the siding 123.

Figure 15:
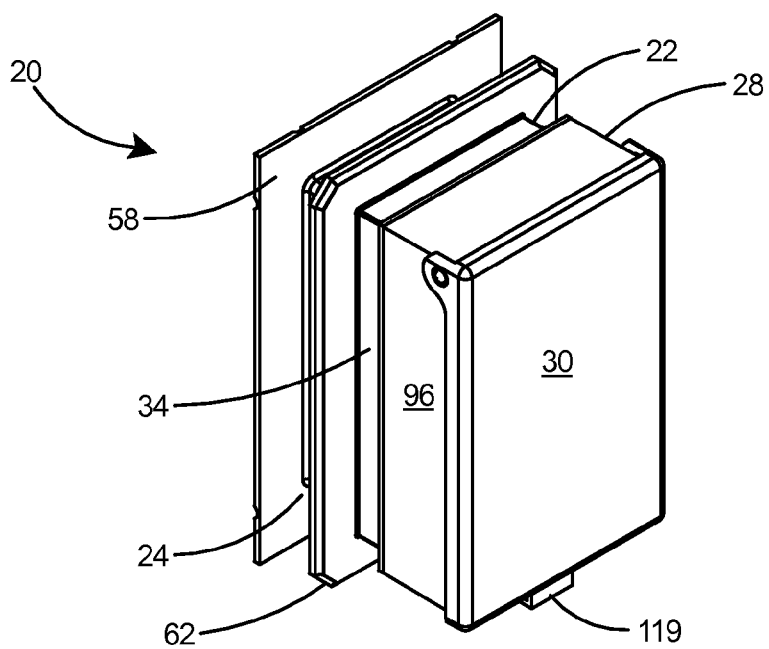
FIG. 15 is a front isometric view of the while-in-use electrical box in a collapsed configuration.

The electrical box assembly 20 can be changed anytime to the collapsed configuration as shown in FIG. 15. To collapse the assembly 20, a homeowner merely presses on pressure tab 80, which reduces the profile across the outer sidewalls 34, and the frame member 28 can be simply pushed toward the second flange 62 to collapse the assembly. When fully collapsed, friction lugs 90 on outer stops 78 apply pressure between sidewalls 96 of frame member 28 and outer sidewalls 34 of electrical box 22 and hold the electrical box assembly 20 in the collapsed configuration. The assembly can be returned to the expanded configuration of FIG. 14 at any desired time by merely pulling the frame member 28 outward. When fully expanded, the pressure tab 80 and outer stops 78 snap outward and engage the frame member 28 and lock the assembly in the expanded configuration. In the expanded configuration, the electrical cord openings 117 (see FIG. 10) will be available for routing electrical cables there through, thereby imparting a while-in-use functionality to the cover 30 of the electrical box assembly 20.

Referring to FIG. 1, cover member 30 preferably includes a peripheral wall 125. Bottom portion of peripheral wall 125 includes two semi-circular cuts 127 therein and an opening 129 in the latch 119. The frame sidewalls 96 of frame member 28 also include two semi-circular cuts 131. Two grooves 133 in the frame sidewall 96 define the tab 109 of the frame member 28. Grooves 133 in the frame member 28 impart flexibility to the tab 109 thereby enabling the tab to flex when cover 30 is closed upon the frame member. When the cover 30 is closed, tab 109 of frame member 28 engages latch 119 of cover at opening 129. When fully closed, latch 119 of cover 30 snaps shut on tab 109 of frame member 28 and locks cover to the electrical box assembly 20. With cover closed, semi-circular cuts 127 of cover 30 align with semi-circular cuts 131 of frame member 28 thereby forming the circular electrical cord openings 117 (see FIG. 10).

The electrical box 22, frame member 28 and cover plate 30 of the present invention may be manufactured of metal or plastic. Most preferably the electrical box 22 frame member 28 and cover plate 30 of the present invention are each molded of plastic in one piece. Thus siding box 24 is an integrally molded portion of electrical box 22, which insures that, when the electrical box assembly is installed to a substrate, water will not seep out of the siding box to the substrate.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An electrical box assembly comprising:
   an electrical box including outer sidewalls and inner sidewalls;
   an integral siding block extending from said inner sidewalls of said electrical box, said inner sidewalls including a base flange and a second flange, said siding block extending between said base flange and said second flange;
   a collapsible cover assembly, said collapsible cover assembly including a frame member and a cover plate hinged to said frame member;
   said frame member of said collapsible cover assembly slideable with respect to said outer sidewalls of said electrical box; and
   said integral siding block preventing rain or water from penetrating into the electrical box.

2. The electrical box assembly of claim 1 including a channel on said electrical box assembly, said channel defined by said base flange and said second flange.

3. The electrical box assembly of claim 1 including a back wall on said electrical box.

4. The electrical box assembly of claim 3 wherein said base flange is coplanar with said back wall of said electrical box.

5. The electrical box assembly of claim 3 including a plurality of breakaway grooves in said back wall of said electrical box.

6. The electrical box assembly of claim 5 including an inner edge on each of said breakaway grooves; and
   said inner edge is in alignment with said inner sidewalls of said electrical box.

7. The electrical box assembly of claim 1 including
   a front edge on said electrical box; and
   a peripheral wall extending laterally outward from said electrical box at said front edge.

8. The electrical box assembly of claim 7 wherein said electrical box includes an inner stop;
   an outer stop; and
   a pressure tab extending outward from said outer sidewalls.

9. The electrical box assembly of claim 8 including an engagement edge on said outer stop.

10. The electrical box assembly of claim 9 including a gap formed between said peripheral wall and said engagement edge of said outer stop.

11. The electrical box assembly of claim 8 wherein said outer stop includes a sloped side.

12. The electrical box assembly of claim 8 including a friction lug extending from said outer stop.

13. The electrical box assembly of claim 1 wherein said frame member includes
   frame sidewalls having an inner surface, an outer surface, and a top edge;
   an outer peripheral wall extending outward from said outer surface at said top edge of said frame sidewalls; and
   an inner peripheral wall extending inward from said inner surface at said top edge of said frame sidewalls.

14. The electrical box assembly of claim 13 including a center stop and a ramp extending from said inner surface of said frame sidewalls.

15. The electrical box assembly of claim 14 including a flat engagement edge on said center stop.

16. The electrical box assembly of claim 13 including a tab extending downward from said outer surface of one of said frame sidewalls.

17. The electrical box assembly of claim 16 wherein said cover plate includes a latch for engaging said tab of said frame member.

18. The electrical box assembly of claim 1 including a bottom edge on said frame member; and
   an inner peripheral wall extending inward at said bottom edge of said frame member.

\* \* \* \* \*